United States Patent
Shang et al.

(10) Patent No.: US 12,183,006 B2
(45) Date of Patent: Dec. 31, 2024

(54) TARGET POSITIONING METHOD, APPARATUS AND SYSTEM

(71) Applicant: TENCENT TECHNOLOGY (SHENZHEN) COMPANY LIMITED, Shenzhen (CN)

(72) Inventors: Hong Shang, Shenzhen (CN); Zijian Zhang, Shenzhen (CN); Zhongqian Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 369 days.

(21) Appl. No.: 17/677,990

(22) Filed: Feb. 22, 2022

(65) Prior Publication Data

US 2022/0180520 A1 Jun. 9, 2022

Related U.S. Application Data

(63) Continuation of application No. PCT/CN2020/124623, filed on Oct. 29, 2020.

(30) Foreign Application Priority Data

Feb. 8, 2020 (CN) .................. 202010083134.X

(51) Int. Cl.
G06T 7/00 (2017.01)
G06T 7/246 (2017.01)

(52) U.S. Cl.
CPC ............ *G06T 7/0014* (2013.01); *G06T 7/248* (2017.01); *G06T 2207/10016* (2013.01); *G06T 2207/10068* (2013.01); *G06T 2207/20081* (2013.01); *G06T 2207/20084* (2013.01); *G06T 2207/30096* (2013.01)

(58) Field of Classification Search
CPC .................. G06T 7/0014; G06T 7/248; G06T 2207/10016; G06T 2207/10068; G06T 2207/20081; G06T 2207/20084; G06T 2207/30096; G06T 2207/20016
See application file for complete search history.

(56) References Cited

FOREIGN PATENT DOCUMENTS

| CN | 109886356 | * | 6/2019 |
| CN | 110363790 | * | 10/2019 |
| CN | 110390351 | * | 10/2019 |
| CN | 110648327 | A | 1/2020 |
| CN | 110738211 | A | 1/2020 |

(Continued)

OTHER PUBLICATIONS

Machine translation for CN 110363790 (Year: 2019).*

(Continued)

*Primary Examiner* — Qian Yang
(74) *Attorney, Agent, or Firm* — ANOVA LAW GROUP PLLC

(57) ABSTRACT

A target positioning method is provided to include: determining, in response to determining that a video frame image including a target lesion is detected from a video stream, location information of the target lesion on the video frame image; tracking the target lesion according to the location information of the target lesion on the video frame image, and determining location information of the target lesion on a video frame image in the video stream.

17 Claims, 4 Drawing Sheets

Determine, in a case that a video frame image including a target lesion is detected from a to-be-detected video stream, location information of the target lesion on the video frame image — 200

Track the target lesion according to the location information of the target lesion on the video frame image, and determine location information of the target lesion on a to-be-tracked video frame image in the to-be-detected video stream — 210

(56) References Cited

FOREIGN PATENT DOCUMENTS

CN          111311635 A     6/2020
WO    WO 2016/030792    *   3/2016

OTHER PUBLICATIONS

Machine translation for CN 110390351 (Year: 2019).*
Machine translation for CN 109886356 (Year: 2019).*
The World Intellectual Property Organization (WIPO) International Search Report for PCT/CN2020/124623 Jan. 29, 2021 8 Pages (including translation).
Jane Bromley et al., "Signature verification using a "siamese" time delay neural network," NIPS 1993, pp.737-744. 8 pages.
Sumit Chopra et al., "Learning a similarity metric discriminatively, with application to face verification," CVPR. 2005. 8 pages.
Luca Bertinetto et al., "Fully-convolutional siamese networks for object tracking," ECCV, 2016, pp. 850-865. 16 pages.

* cited by examiner

TARGET POSITIONING METHOD, APPARATUS AND SYSTEM

RELATED APPLICATION(S)

This application is a continuation application of PCT Patent Application No. PCT/CN2020/124623 filed on Oct. 29, 2020, which claims priority to Chinese Patent Application No. 202010083134X, entitled "TARGET POSITIONING METHOD, APPARATUS AND SYSTEM", filed with the China National Intellectual Property Administration on Feb. 8, 2020, all of which are incorporated herein by reference in entirety.

FIELD OF THE TECHNOLOGY

The present disclosure relates to the field of computer technologies, and in particular, to a target positioning method, apparatus and system.

BACKGROUND

For detection of lesions in an endoscopic diagnosis system, a target detection method may be used to detect each video frame image in a real-time video stream of an endoscope. A quantity of lesions that may exist in any locations are determined on each video frame image, and a positioning location of each lesion is given.

However, this method relies on a target detection method and each video frame may be detected. There are problems in terms of a speed and robustness. In terms of the speed, the frame rate of a video stream of the endoscope is usually relatively high, but to ensure a certain accuracy rate, the target detection method usually consumes longer time than this duration. Consequently, some frames are prone to be missed, or a lesion has shifted when a detection result is outputted, resulting in inaccurate positioning. In terms of the robustness, because timing information of the video stream is not considered and detection is performed frame by frame, several frames of a plurality of frames in which the lesion appears may be predicted as "lesion-free". However, a "lesion-free" prediction each time causes the next "lesion-containing" frame to be regarded as appearance of a new lesion, but it is actually the same lesion, which reduces robustness and reliability.

SUMMARY

According to embodiments provided in the present disclosure, a target positioning method, apparatus, and system are provided.

In one aspect, the present disclosure provides a target positioning method, including: determining, when or in response to determining that a video frame image including a target lesion is detected from a video stream, location information of the target lesion on the video frame image; and tracking the target lesion according to the location information of the target lesion on the video frame image, and determining location information of the target lesion on a video frame image in the video stream.

In another aspect, the present disclosure provides a target positioning apparatus, including: a target positioning apparatus, comprising: a memory storing computer program instructions; and a processor coupled to the memory and configured to execute the computer program instructions and perform: determining, in response to determining that a video frame image including a target lesion is detected from a video stream, location information of the target lesion on the video frame image; and tracking the target lesion according to the location information of the target lesion on the video frame image, and determining location information of the target lesion on a video frame image in the video stream.

In yet another aspect, the present disclosure provides a non-transitory computer-readable storage medium storing computer program instructions executable by at least one processor to perform: determining, in response to determining that a video frame image including a target lesion is detected from a video stream, location information of the target lesion on the video frame image; and tracking the target lesion according to the location information of the target lesion on the video frame image, and determining location information of the target lesion on a video frame image in the video stream.

Other aspects of the present disclosure can be understood by those skilled in the art in light of the description, the claims, and the drawings of the present disclosure.

Details of one or more embodiments of the present disclosure are provided in the subsequent accompanying drawings and descriptions. Other features, objectives, and advantages of the present disclosure become apparent from the present disclosure, the accompanying drawings, and the claims.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
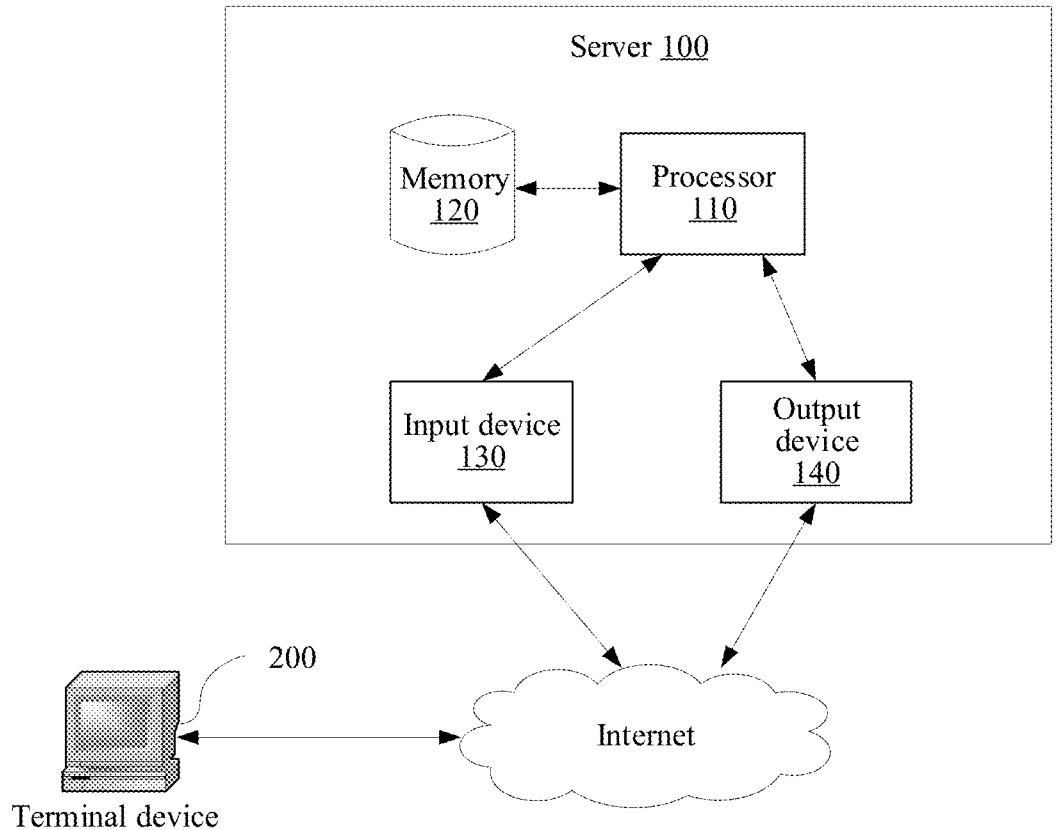
FIG. 1 is a schematic diagram of an implementation architecture of a target positioning method according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiment(s)" or "certain embodiment(s)" describe subsets of all possible embodiments, but it may be understood that the "some embodiment(s)" or "certain embodiment(s)" may be the same subset or different subsets of all the possible embodiments, and can be combined with each other without conflict.

In certain embodiments, the term "based on" is employed herein interchangeably with the term "according to."

To facilitate the understanding of the embodiments of the present disclosure, the following concepts are first briefly introduced.

Video stream: In the embodiments of the present disclosure, it refers to image video streams scanned during various medical diagnosis, for example, medical image video streams obtained by endoscopic scanning, including an endoscopic colorectal video stream, and the like, which is not limited herein, and can also be video streams in other service fields.

Lesion: It represents a part of the body where a pathological change occurs, for example, colorectal polyps.

Target: When or in response to determining that a video stream in the embodiments of the present disclosure is a medical-related video stream, the target is a target lesion.

Siamese network: It is a machine learning network structure, that is, a neural network framework, rather than a network. In an implementation, a convolutional neural network (CNN) can be used to measure a similarity of two inputs. In the embodiments of the present disclosure, a tracking model tracks a target lesion and determines a location of the target lesion on a video frame image based on a siamese network through similarity detection of target lesions in different video frame images.

Convolutional neural network (CNN): A CNN is a deep feedforward artificial neural network.

Artificial intelligence (AI) is a theory, method, technology, and implementation system that uses a digital computer or a machine controlled by the digital computer to simulate, extend, and expand human intelligence, perceive an environment, obtain knowledge, and use knowledge to obtain an optimal result. In other words, AI is a comprehensive technology of computer sciences, attempts to understand essence of intelligence, and produces a new intelligent machine that can react in a manner similar to human intelligence. The AI is to study the design and implementation methods of various intelligent machines, to enable the machines to have the functions of perception, reasoning, and decision-making.

The AI technology is a comprehensive discipline, covering a wide range of fields including both hardware-level technologies and software-level technologies. Basic AI technologies generally include technologies such as a sensor, a dedicated AI chip, cloud computing, distributed storage, a big data processing technology, an operation/interaction system, or mechatronics. AI software technologies include directions such as a CV technology, a speech processing technology, a natural language processing technology, and machine learning/deep learning (DL).

CV is a science that studies how to use a machine to "see", and furthermore, is machine vision in which a camera and a computer are used for replacing human eyes to perform recognition, tracking, and measurement, and the like on a target, and further perform graphics processing, so that the computer processes the target into an image more suitable for human eyes to observe or an image transmitted to an instrument for detection. As a scientific subject, the CV studies related theories and technologies and attempts to establish an AI system that can obtain information from images or multidimensional data. The CV technologies usually include technologies such as image processing, image recognition, image semantic understanding, image retrieval, optical character recognition (OCR), video processing, video semantic understanding, video content/behavior recognition, three-dimensional (3D) object reconstruction, a 3D technology, virtual reality, augmented reality, synchronous positioning, and map construction, and further include biological feature recognition technologies such as common face recognition and fingerprint recognition. For example, in the embodiments of the present disclosure, the AI technology can be applied to the medical field. The embodiments of the present disclosure involve the CV technologies in AI. Target lesion detection may be performed on a video frame image in a to-be-detected video stream through the image semantic understanding technology in the CV technologies, to detect whether the video frame image includes a target lesion. In another example, in the embodiments of the present disclosure, tracking of a target lesion can further be achieved through the video semantic understanding technology in the CV technologies.

With the research and progress of the AI technology, the AI technology is studied and applied to a plurality of fields such as a common smart home, a smart wearable device, a virtual assistant, a smart speaker, smart marketing, unmanned driving, automatic driving, an unmanned aerial vehicle, a robot, smart medical care, and smart customer service. With the development of technologies, the AI technology will be applied to more fields, and play an increasingly important role.

The solutions provided in the embodiments of the present disclosure relate to technologies such as CV of AI, and are described by using the following embodiments:

Currently, for AI-assisted endoscopic detection of a target lesion, for example, a colorectal polyp detection method, usually a target detection method is used to detect each video frame image in a real-time video stream of an endoscope. However, this method relies on the target detection method and each video frame image is detected, and there are problems in terms of a speed and robustness. In terms of the speed, only when providing a prediction result in real time, AI-assisted detection has clinical value. Generally, the frame rate of the endoscopic video stream is relatively high. For example, currently, the frame rate of an endoscopic video stream is usually 25 frames per second (fps), and an interval of each frame is 40 milliseconds (ms). To ensure a certain accuracy rate, the target detection method consumes longer time than this duration. Consequently, some frames are missed, or a lesion has shifted when a prediction is given, resulting in inaccurate positioning or drag effects on the product experience. In terms of the robustness, timing information of a video stream is not considered. For example, a lesion in an endoscopic video stream cannot appear or disappear instantaneously, but appears from an edge of a screen, is zoomed in and zoomed out, and finally disappears. In a frame-by-frame detection manner, several frames of a plurality of frames in which a lesion appears may be predicted as "lesion-free". However, a "lesion-free" prediction each time causes the next "lesion-containing" frame to be regarded as appearance of a new lesion, and a new alert is issued, but it is actually the same lesion, which reduces the robustness and reliability, and causes a plurality of alerts for the same lesion, easily disturbing a doctor's clinical operation.

Embodiments of the present disclosure provide a target positioning method. When or in response to determining that a video frame image including a target lesion is detected from a to-be-detected video stream, location information of the target lesion on the video frame image is determined, and then a tracking process can be triggered. The target lesion is tracked according to the location information of the target lesion on the detected video frame image including the target lesion, and location information of the target lesion on a to-be-tracked video frame image in the to-be-detected video stream is determined. In this way, after the target lesion is detected, the tracking process is triggered to locate and track the target lesion. Compared with detection, tracking is less difficult, because the target lesion is a certain object, is near a given location, and has a known shape, and known information obtained during subsequent tracking is clearer and richer. Therefore, compared with the detection, the tracking has a higher speed and can ensure the real-time performance, and tracking of the target lesion in the to-be-detected video stream combines timing information of the to-be-detected video stream, a target lesion that appears on a plurality of consecutive video frame images can be predicted as the target lesion, which reduces misjudgment and enhances robustness and reliability.

In certain embodiment(s), the term "to-be-detected video stream" is interchangeable with the term "video stream," and the term "to-be-tracked video frame" is interchangeable with the term "video frame."

FIG. 1 is a schematic diagram of an implementation architecture of a target positioning method according to an embodiment of the present disclosure, including a server 100 and a terminal device 200.

The terminal device 200 may be a medical device. For example, a user can collect an endoscopic image video stream by using the terminal device 200, and can further view a tracking result of a target lesion in a to-be-detected video stream based on the terminal device 200, including location information that appears on a video frame image of the to-be-detected video stream.

The terminal device 200 and the server 100 may be connected through an internetwork, to communicate with each other. In certain embodiment(s), a standard communication technology and/or protocol is used for the internetwork described above. The internetwork is usually the Internet, but may alternatively be any other network, including but not limited to, a local area network (LAN), a metropolitan area network (MAN), a wide area network (WAN), or any combination of a mobile, wired, or wireless network, a dedicated network, or a virtual dedicated network. In some embodiments, technologies and/or formats, such as hypertext markup language (HTML) and extensible markup language (XML), are used for representing data exchanged through a network. In addition, all or some links may be encrypted by using any suitable encryption technologies such as a secure socket layer (SSL), transport layer security (TLS), a virtual private network (VPN), and internet protocol security (IPsec). In some other embodiments, custom and/or dedicated data communication technologies may also be used in place of or in addition to the data communication technologies.

The server 100 can provide various network services for the terminal device 200, where the server 100 may be one server, a server cluster including several servers, or a cloud computing center.

In certain embodiment(s), the server 100 may include a center processing unit (CPU) 110, a memory 120, an input device 130, an output device 140, and the like. The input device 130 may include a keyboard, a mouse, a touchscreen, and the like. The output device 140 may include a display device, such as a liquid crystal display (LCD) or a cathode ray tube (CRT).

In this embodiment of the present disclosure, the target positioning method is performed by the server 100, and a training process of the tracking model in this embodiment of the present disclosure is also performed by the server 100. For example, the terminal device 200 transmits the collected to-be-detected video stream to the server 100, and the server 100 performs target lesion detection on each video frame image in the to-be-detected video stream. For example, a trained detection model is used to perform detection. When or in response to determining that a video frame image including a target lesion is detected, the tracking model is triggered to track the target lesion and determine location information of the target lesion on a to-be-tracked video frame image until the target lesion disappears, and the server 100 may transmit target lesion detection and tracking results, that is, location information of the target lesion in each video frame image, to the terminal device 200. For example, the location information may be transmitted to the terminal device 200 each time the target lesion is detected or tracked down, so that a user can see real-time location information of the target lesion appearing in each video frame image on the terminal device 200. The implementation architecture shown in FIG. 1 is described by using an example in which the method is applied to the server 100.

In certain embodiment(s), the target positioning method in this embodiment of the present disclosure may alternatively be performed by the terminal device 200. For example, the terminal device 200 may obtain a trained detection model and a tracking model from the server 100, and may detect a target lesion based on the detection model. When or in response to determining that a video frame image including a target lesion is detected, the tracking model is triggered to track and locate the target lesion, which is not limited in the embodiments of the present disclosure.

For example, when or in response to determining that a to-be-detected video stream is an endoscopic colorectal video stream, a target lesion is, for example, a polyp.

A diagram of an implementation architecture in this embodiment of the present disclosure is intended to more clearly describe the technical solutions of the embodiments of the present disclosure, does not constitute a limitation to the technical solutions provided in the embodiments of the present disclosure, and is not limited to medical service implementations. For other implementation architectures and service implementations, the technical solutions provided in the embodiments of the present disclosure are also applicable to similar problems.

Exemplary description is made by using an example in which the embodiments of the present disclosure are applicable to the diagram of the implementation architecture shown in FIG. 1.

Figure 2:
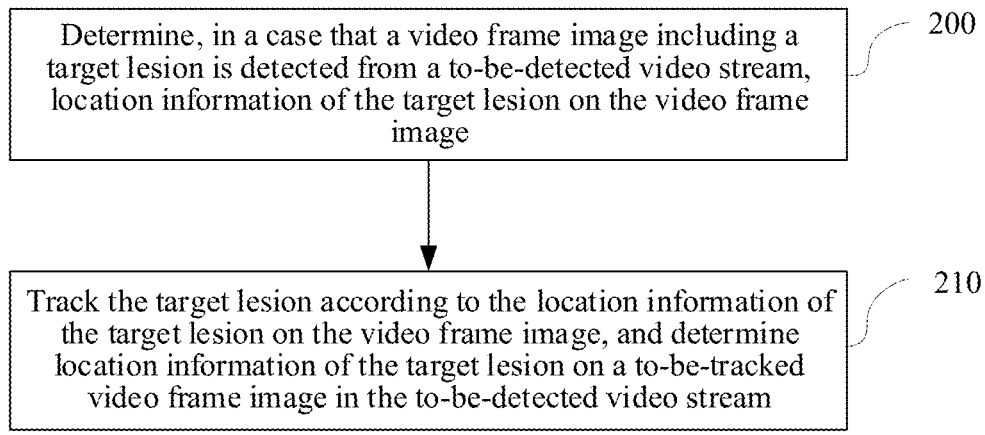
FIG. 2 is a schematic flowchart of a target positioning method according to embodiment(s) of the present disclosure.

Based on the embodiments, FIG. 2 is a flowchart of a target positioning method according to an embodiment of the present disclosure. The method includes the following steps:

Step 200: Determine, when or in response to determining that a video frame image including a target lesion is detected from a to-be-detected video stream, location information of the target lesion on the video frame image.

This embodiment of the present disclosure describes a method in which: when a video frame image including a target lesion is detected, a tracking process can be triggered to track and locate the target lesion, and the target lesion is detected.

For example, when or in response to determining that step 200 is performed, an implementation is provided in this embodiment of the present disclosure. According to image feature information of the target lesion and a preset detection method, target lesion detection is performed on each video frame image in the to-be-detected video stream to determine whether a video frame image including the target lesion is detected. When or in response to determining that it is determined that the video frame image including the target lesion is detected, the location information of the target lesion on the video frame image is determined.

In another example, a detection method is a detection model. A detection model is obtained through pre-training according to an image sample set of the target lesion. The term "pre-training" refers to an implementation where the detection model has been trained in advance of one or more steps of a detection. The detection model can further be used to detect each video frame image in the to-be-detected video stream to determine whether the target lesion is detected.

The detected location information is not only coordinates of a point. Generally, the target lesion does not appear as a point in the video frame image, but a region. Therefore, the location information indicates coordinates of a target region range of the target lesion on the video frame image, for example, location coordinates of a positioning frame.

In the detection of the target lesion in this embodiment of the present disclosure, not each video frame image may be detected. Generally, the to-be-detected video stream has a certain frame rate, and the detection method also consumes a certain time when or in response to determining that a video frame image is detected, but the two are usually different. For example, the frame rate of an endoscopic video stream is usually lower. Therefore, in this embodiment of the present disclosure, the detection method may be allowed to perform target lesion detection on the to-be-detected video frame image according to a time-consuming interval of the detection. After detection, each frame of the to-be-tracked video frame image can be tracked based on a tracking process until the target lesion disappears, that is, until it is determined that the target lesion is not tracked down, which reduces the possibility of missing frames.

Step 210: Track the target lesion according to the location information of the target lesion on the video frame image, and determine location information of the target lesion on a to-be-tracked video frame image in the to-be-detected video stream.

Step 210 includes the following substeps:

S1. Use a region image corresponding to the location information of the target lesion on the video frame image as a template region image, and sequentially select a preset range region image centered on the location information corresponding to the target lesion from the to-be-tracked video frame image in the to-be-detected video stream as a search region image.

In this embodiment of the present disclosure, when or in response to determining that location information on a first video frame image in which the target lesion appears is obtained during tracking, the target lesion may be tracked by using the location information as an input parameter.

The to-be-tracked video frame image in the to-be-detected video stream is video frame images starting from the next video frame image of the detected video frame image including the target lesion, until a tracked video frame image in which the target lesion is determined to have disappeared. However, it is not limited in this embodiment of the present disclosure.

Therefore, during tracking, to enhance the efficiency and the speed, an image near the target lesion is selected from the to-be-tracked video frame image, that is, location information of the last video frame of the frame in which the target lesion appears is used as a center, a preset range region image is selected as a search region image. For more accurate positioning, a relatively large region image can be selected as the search region image.

S2. Determine a first similarity value between the search region image and the template region image.

The determining a first similarity value between the search region image and the template region image includes the following steps:

S2.1. Respectively map the search region image and the template region image to a set-dimensional feature space based on a convolutional neural network, to obtain feature vectors corresponding to the search region image and the template region image.

S2.2. Perform a two-dimensional convolution operation on the feature vectors corresponding to the search region image and the template region image to determine a second similarity value between each image block in the search region image and the template region image, each of the image blocks being obtained by sliding a sliding window on the search region image with a preset stride.

A size of the sliding window is the same as that of the template region image. For example, a size of the template region image is 6*6*128, a size of the search region image is 22*22*128, and a preset stride is 1. In this way, when or in response to determining that the search region image is divided into a plurality of image blocks through a two-dimensional convolution operation, sliding is performed with 1 stride by using a 6*6*128 sliding window, and the 22*22*128 search region image can be divided into 17*17*1 image blocks.

S2.3. Use a two-dimensional matrix formed by arranging the second similarity values according to positions of corresponding image blocks on the search region image as the first similarity value between the search region image and the template region image.

That is, in this embodiment of the present disclosure, the second similarity value between each image block and the template region image is calculated to obtain the plurality of second similarity values. It can be seen that the first similarity value between the template region image and the search region image is not a number, but a two-dimensional matrix, for example, a (17*17) two-dimensional matrix, where each value in the two-dimensional matrix represents a second similarity value of a corresponding image block in the search region image.

S3. When or in response to determining that it is determined that the first similarity value satisfies a similarity condition, determine that the target lesion is tracked down, and determine location information of the target lesion on the search region image.

In certain embodiment(s), when or in response to determining that it is determined that a second similarity value not less than a preset threshold exists in the two-dimensional matrix of the first similarity value, it is determined that the target lesion is tracked down; and location information of an image block corresponding to the largest second similarity value among the second similarity values is determined as the location information of the target lesion on the search region image.

For example, the first similarity value is a two-dimensional matrix with a size of 2*2, values are (0.3, 0.4; 0.5, 0, 8), and a preset threshold is 0.6, then it is determined that 0.8 greater than 0.6 exists, and then it is determined that the target lesion is tracked down, and 0.8 is the maximum value. Therefore, location information of the image block corresponding to 0.8 is the location information of the target lesion on the to-be-tracked video frame image.

Further, when or in response to determining that it is determined that the first similarity value does not satisfy the similarity condition, it is determined that the target lesion is not tracked down, and the tracking is ended.

When or in response to determining that it is determined that no second similarity value not less than a preset threshold exists in the two-dimensional matrix of the first similarity value, it is determined that the target lesion is not tracked down, and the tracking can be ended.

For example, the video frame image including the target lesion that is detected from the to-be-detected video stream is a sixth frame, that is, a tracking process is triggered, and the tracking starts from a seventh video frame image. When or in response to determining that it is determined that the target lesion is tracked down from the seventh video frame image to an eighteenth video frame image, and a first similarity value calculated from a nineteenth video frame image does not meet the similarity condition, it is determined that the target lesion is not tracked down, and the tracking can be ended, that is, a tracking process triggered this time is ended. In this way, through a combination of detection and tracking, it can be detected that the sixth video frame image to the nineteenth video frame image include the target lesion, and the location information of the target lesion can be determined, to reduce the possibility of missing frames, and enhance the robustness.

Further, in this embodiment of the present disclosure, when or in response to determining that the target lesion is detected, an alert can further be issued. In certain embodiment(s), an implementation is provided. When or in response to determining that a video frame image including the target lesion is detected from the to-be-detected video stream, the method further includes: issuing an alert in a preset manner to indicate that the target lesion appears.

For example, an alert is issued through voice, text, and different sounds such as "beep".

In this way, in this embodiment of the present disclosure, after the target lesion is detected, the tracking method is used to track the target lesion, which having less tracking difficulty; and timing information of the video stream is used during tracking, that is, displacement of an object between two adjacent frames is limited. Therefore, consistent predictions can be outputted on a plurality of consecutive frames in which the target lesion appears, so as to reduce false negatives, and enhance the robustness and reliability, thereby reducing a plurality of alerts for a same target lesion, and reducing disturbance to a doctor's clinical operation.

Further, the method for performing step 210 may be implemented by using a tracking model. An implementation is provided in this embodiment of the present disclosure. In certain embodiment(s), the tracking the target lesion according to the location information of the target lesion on the video frame image, and determining location information of the target lesion on a to-be-tracked video frame image in the to-be-detected video stream includes: triggering a trained tracking model, tracking the target lesion based on the tracking model by using the location information of the target lesion on the video frame image as an input parameter, and determining the location information of the target lesion on the to-be-tracked video frame image in the to-be-detected video stream.

The tracking model is obtained through training according to a training image sample pair set, the training image sample pair set includes a plurality of training image sample pairs with similarity value labels, and the training image sample pair is constructed based on two video frame images selected from a video stream sample in which the target lesion appears.

An implementation of tracking the target lesion based on the tracking model is the same as that of step 210 in the embodiment, except that the tracking model may be obtained through machine learning and training in advance, and the implementation of step 210 is implemented by using the tracking model.

Figure 3:
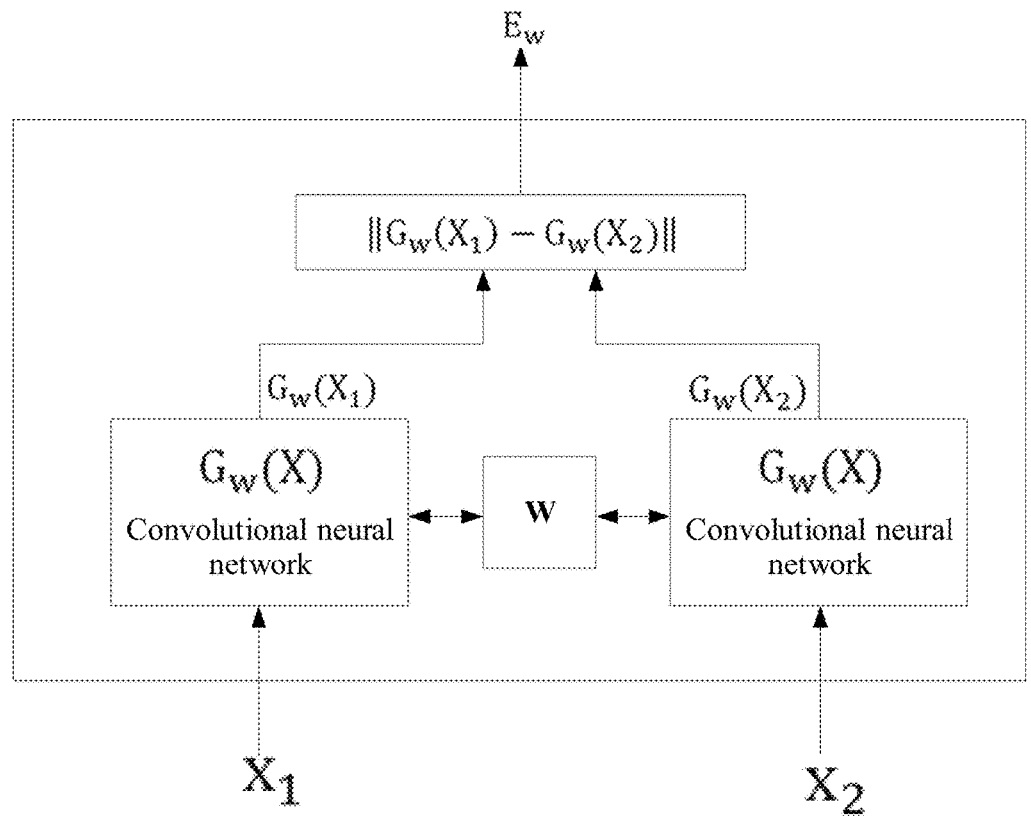
FIG. 3 is a schematic diagram of a network structure of a siamese network according to embodiment(s) of the present disclosure.

In certain embodiment(s), in this embodiment of the present disclosure, the tracking model uses an algorithm based on a siamese network. For ease of understanding, a network structure of the siamese network is briefly described below. FIG. 3 is a schematic diagram of a network structure of a siamese network according to an embodiment of the present disclosure. As shown in FIG. 3, An input of the siamese network is a data pair $x_1$ and $x_2$, for example, the search region image and the template region image, which are respectively processed by a same network, such as a CNN, and convolutional features $G_w(X_1)$ and $G_w(X_2)$ are outputted. By measuring a certain distance $\|G_w(X_1)-G_w(X_2)\|$ between the two convolution features, whether the two images are similar is determined.

Figure 4:
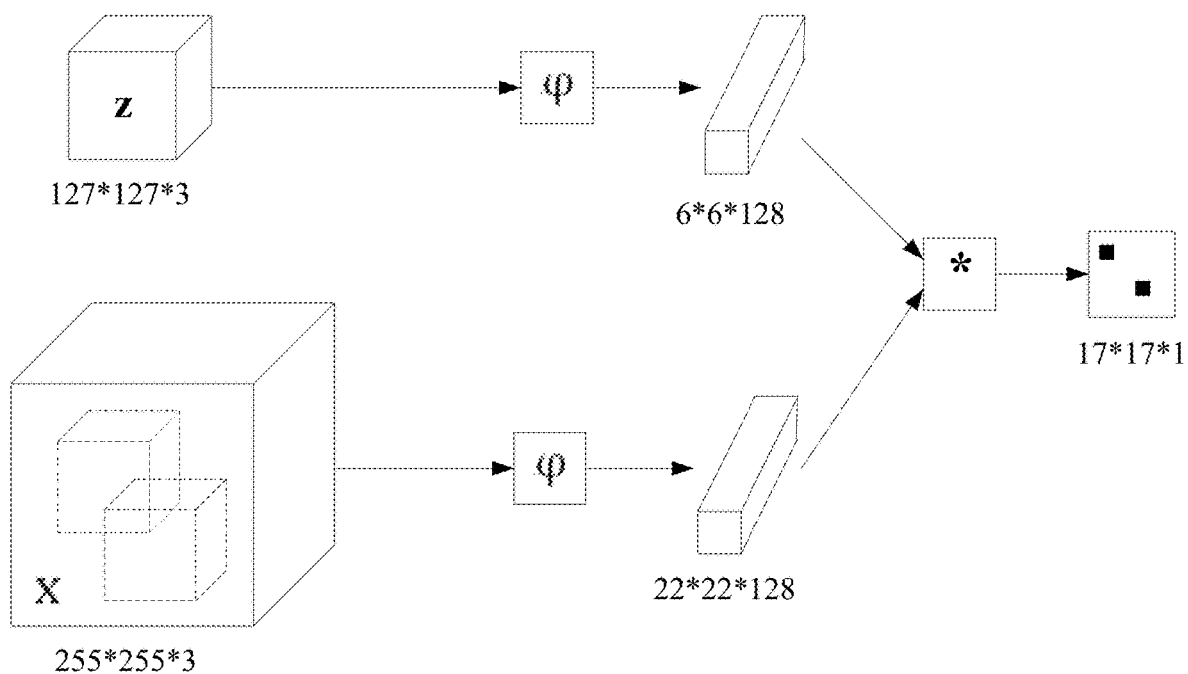
FIG. 4 is a schematic framework diagram of a tracking model according to embodiment(s) of the present disclosure.

In this way, based on the similarity network, by comparing similarity between the two inputs, that is, the search region image and the template region image, whether the target lesion is tracked down can be determined, and the location information of the target lesion can be determined. For example, FIG. 4 is a frame diagram of a tracking model according to an embodiment of the present disclosure. As shown in FIG. 4, when or in response to determining that the video frame image including the target lesion is detected, a region image corresponding to the location information of the target lesion on the video frame image is used as the template region image, denoted as z. For example, the location information of the target lesion on the video frame image is used as a center to select the search region image from the to-be-tracked video frame image, denoted as x. Sizes of x and z may not be the same. For more accurate positioning, a size of z is smaller and a size of x is larger. For example, the size of z is 127*127*3 and the size of x is 255*255*3, so an outputted similarity value is not a number but a two-dimensional matrix φ represents a feature mapping operation. To improve calculation efficiency, an original image is mapped to a set-dimensional feature space by x and z through φ, which can be implemented by using a convolutional layer and a pooling layer in CNN. As shown in FIG. 4, 6*6*128 represents a feature obtained after φ is performed on z, which is a 128-channel feature with a size of 6*6. Similarly, 22*22*128 is a feature obtained after φ is performed on x. In FIG. 4, "*" represents a convolution operation, the feature of 22*22*128 is convolved by a 6*6*128 convolution kernel to obtain a 17*17 two-dimensional matrix. Each value represents similarity between each image block in the search region image and the template region image, where the CNN herein may be a fully convolutional AlexNet. A similarity value is calculated by using cross correlation, which is implemented through a two-dimensional convolution operation in the CNN. Furthermore, when or in response to determining that there is a value greater than a preset threshold, it is determined that the target lesion is tracked down, and location information of an image block corresponding to the largest value is determined as the location information of the target lesion on the current video frame image.

In this embodiment of the present disclosure, the tracking the target lesion based on the tracking model by using the location information of the target lesion on the video frame image as an input parameter, and determining the location information of the target lesion on the to-be-tracked video frame image in the to-be-detected video stream includes the following steps:

1) The location information of the target lesion on the video frame image is used as the input parameter, and the template region image and the search region image are mapped to the set-dimensional feature space by using two identical neural networks to obtain the feature vectors corresponding to the search region image and the template region image.

A network structure of the tracking model includes at least two identical neural networks, the neural network includes at least a convolutional layer and a pooling layer, the template region image is a region image corresponding to the location information of the target lesion on the video frame image, and the search region image is a preset range region image selected from the to-be-tracked video frame image and centered on the location information corresponding to the target lesion.

The neural network may be a CNN

2) The two-dimensional convolution operation is performed on the feature vectors corresponding to the search region image and the template region image by using the convolutional layer to obtain the first similarity value between the search region image and the template region image.

3) When or in response to determining that it is determined that the first similarity value satisfies a similarity condition, it is determined that the target lesion is tracked down, and the location information of the target lesion on the search region image is determined.

Further, when or in response to determining that, if a certain video frame image includes a plurality of target lesions is detected based on the detection model, the tracking model can be triggered to perform parallel processing to respectively track the plurality of target lesions, and respectively determine location information of the plurality of target lesions on the to-be-tracked video frame image. In a process of tracking the target lesion based on the tracking model, the detection model also performs detection based on its own detection interval. When or in response to determining that the detection model detects a new target lesion before the tracking is ended, the tracking model is triggered again to track the new target lesion without affecting the previous tracking process. The two tracking processes can be performed in parallel.

In this embodiment of the present disclosure, when or in response to determining that the video frame image including the target lesion is detected from the to-be-detected video stream, the location information of the target lesion on the video frame image is determined, and the tracking process is triggered. Then, the target lesion is tracked according to the location information of the target lesion on the video frame image, and the location information of the target lesion on the to-be-tracked video frame image in the to-be-detected video stream is determined. In this way, the tracking model is introduced to locate the target lesion through detection and tracking. When or in response to determining that a first video frame image in which the target lesion appears is detected, the tracking model is triggered, and the target lesion is tracked and located in real time based on the tracking model until the target lesion disappears from the field of view, and the tracking is ended. Compared with detection, the tracking is less difficult and therefore is faster. For example, through experiments, after the tracking model is introduced in this embodiment of the present disclosure, a running speed of the target positioning method is 60-70 fps, which is much higher than a running speed 5-12 fps of the detection model, and is also higher than the real-time frame rate 25 fps of the video stream, thereby ensuring the real-time performance of the product. Simultaneously, based on the tracking, timing information of the video stream is used to enhance the robustness and reliability, reduce a plurality of alerts of a same lesion, and reduce false alerts.

Figure 5:
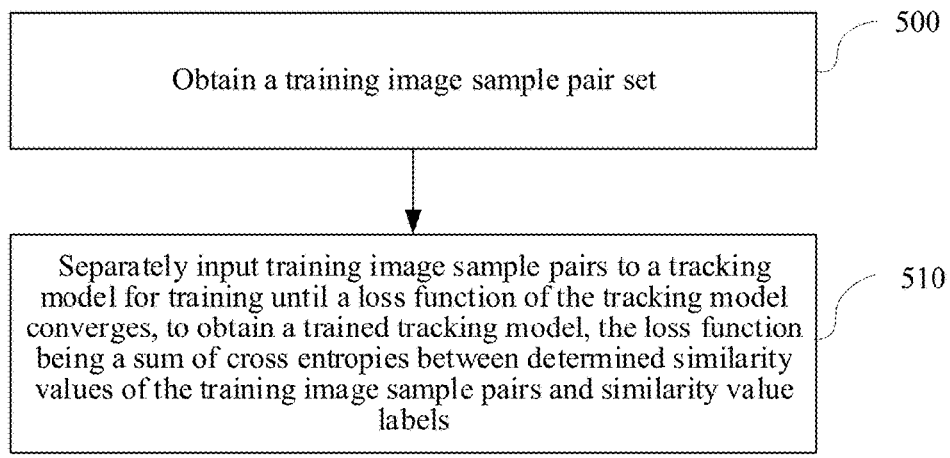
FIG. 5 is a schematic flowchart of a tracking model training method according to embodiment(s) of the present disclosure.

Based on the embodiment, a training process of the tracking model in this embodiment of the present disclosure is briefly described. FIG. 5 is a schematic flowchart of a tracking model training method according to an embodiment of the present disclosure. The method includes the following steps:

Step 500. Obtain a training image sample pair set.

In certain embodiment(s), step 500 includes the following substeps:

S1. Obtain a video stream sample set in which the target lesion appears, the video stream sample set including a plurality of video stream samples in which the target lesion appears.

For example, for a colorectal polyp detection scenario, a video stream sample set can be determined by collecting a series of endoscopic colorectal videos and selecting video clips in which a polyp appears.

S2. For each video frame image included in the video stream samples and by using the target lesion as a center, select a first preset range of template region image and a second preset range of search region image from the each video frame image, the second preset range being greater than the first preset range.

Figure 6:
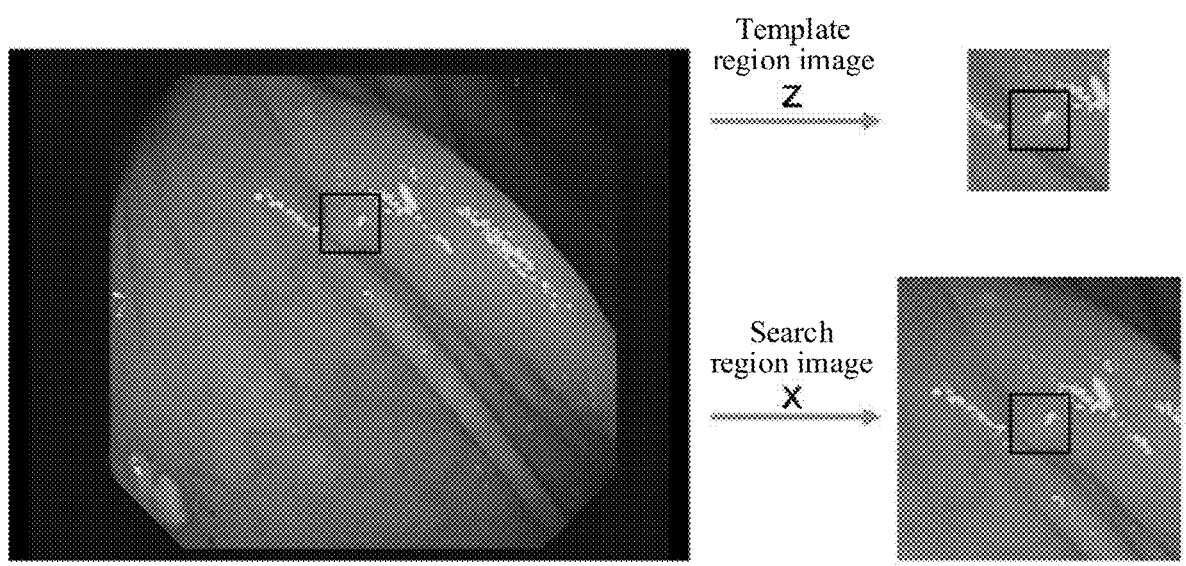
FIG. 6 is a schematic diagram of selecting a template region image and a search region image according to embodiment(s) of the present disclosure.

For example, FIG. 6 is a schematic diagram of selecting the template region image and the search region image in this embodiment of the present disclosure. In this embodiment of the present disclosure, for each frame in the video stream sample, a template region image z and a search region image x can be selected respectively with a polyp as a center (that is, a part circled by a small box in FIG. 6), and the search region image is larger than the template region image.

S3. Select two video frame images from video frame images included in the video stream samples, and select a template region image of one video frame image and a search region image of the other video frame image among the two selected video frame images.

S4. Use the selected template region image and search region image as a training image sample pair, and generate a similarity value label of the training image sample pair, the similarity value label being a two-dimensional matrix.

For example, two different frames of a same polyp are selected from the video stream sample, such as a frame a and a frame b. For example, a selected template region image on the frame of video frame image a is selected, and a search region image selected on the frame of video frame image b is selected, to form a data pair, and a true similarity value label of the data pair is generated. Sizes of the search region image and the template region image are different. Therefore, the similarity value label is the two-dimensional matrix, where a value at the center in which lesions overlap is 1, and a background value is 0 in other places.

In this way, by repeating the above method, enough data pairs with similarity value labels, that is, a plurality of training image sample pairs, can be obtained, and each training image sample pair is a search region image and a template region image.

Step 510: Separately input the training image sample pairs to the tracking model for training until a loss function of the tracking model converges, to obtain a trained tracking model, the loss function being a sum of cross entropies between determined similarity values of the training image sample pairs and the similarity value labels.

In certain embodiment(s), in this embodiment of the present disclosure, a siamese network is trained according to the training image sample pair set, and for each training image sample pair, a two-dimensional matrix representing similar values is outputted by using the siamese network. For example, a size of the template region image is 127*127*3, a size of the search region image is 255*255*3, and a similarity value, that is, a 17*17 two-dimensional matrix, is outputted. Then through an element-wise sigmoid function, the similarity value is converted to a range of 0 to 1, and then a binarized cross entropy function is calculated together with a true similar value label. A sum of the cross entropy corresponding to each training image sample pair is used as a total loss function. Iterative training is performed. For example, a stochastic gradient descent method is used to perform iterative training until the loss function converges and is minimized, and a trained tracking model is obtained.

In addition, in this embodiment of the present disclosure, to construct an effective loss function, location points corresponding to the search region image are distinguished with positive and negative samples, that is, points within a certain target range are used as the positive samples, and points outside this range are used as the negative samples. For example, in a two-dimensional matrix that is finally generated, one part is a positive sample, and the other part is a negative sample. Therefore, when or in response to determining that a loss function of a training image sample pair is calculated, the quantity of the negative samples is much larger than that of the positive samples. Therefore, loss items of the positive samples and the negative samples can be separately averaged and then added, which can prevent the contribution of the positive samples from being inundated by the negative sample, and further improve the accuracy.

In this way, in this embodiment of the present disclosure, for an implementation scenario of the target lesion, a corresponding video stream sample in which the target lesion appears is obtained, and then the training image sample pair set is obtained from the video stream sample. Training is performed based on the training image sample pair set to obtain the tracking model. Tracking and positioning of the target lesion can be implemented based on the tracking model. The method is applicable to a detection scenario of the target lesion, and can enhance the speed and reliability.

The steps in the embodiments of the present disclosure are not necessarily performed according to a sequence indicated by step numbers. Unless otherwise explicitly specified in the present disclosure, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

Figure 7:
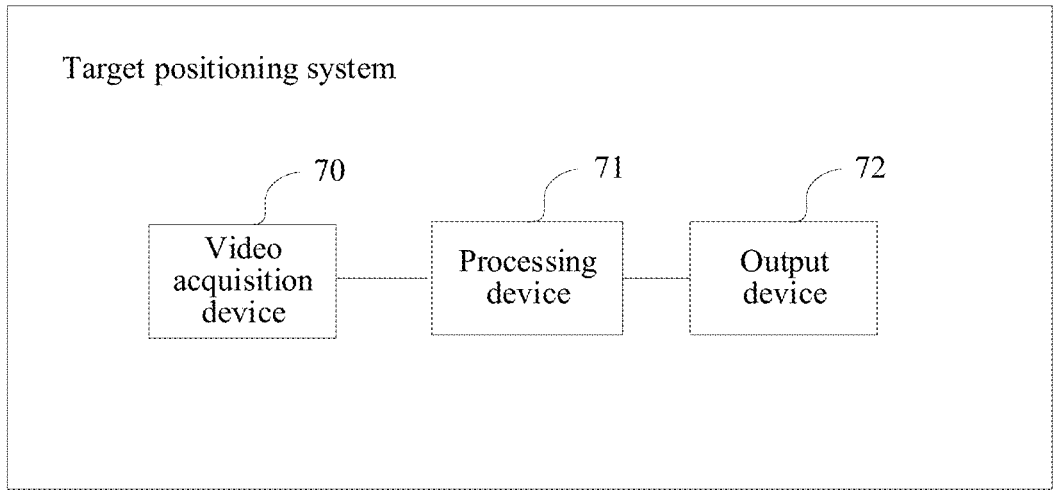
FIG. 7 is a schematic structural diagram of a target positioning system according to embodiment(s) of the present disclosure.

Based on the embodiments, FIG. 7 is a schematic structural diagram of a target positioning system according to an embodiment of the present disclosure.

The target positioning system, includes at least a video acquisition device 70, a processing device 71 and an output device 72. In this embodiment of the present disclosure, the video acquisition device 70, the processing device 71, and the output device 72 are related medical devices, which may be integrated in the same medical device, or divided into a plurality of devices to connect and communicate with each other to form a medical system for use. For example, for diagnosis of colorectal polyps, the video acquisition device 70 may be an endoscope, and the processing device 71 and the output device 72 may be computing devices that communicate with the endoscope.

In certain embodiment(s), the video acquisition device 70 is configured to obtain a to-be-detected video stream.

The processing device 71 is configured to: determine, when or in response to determining that a video frame image including a target lesion is detected from a to-be-detected video stream, location information of the target lesion on the video frame image; and track the target lesion according to the location information of the target lesion on the video frame image, and determine location information of the target lesion on a to-be-tracked video frame image in the to-be-detected video stream.

The output device 72 is configured to output the location information of the target lesion on the video frame image and location information on the to-be-tracked video frame image.

In this embodiment of the present disclosure, during detection and positioning of the target lesion, when or in response to determining that the target lesion is detected, a tracking process can be triggered to track the target lesion, and the location information of the target lesion is determined. Further, the determined location information of the target lesion can be displayed for a user to view. In this way, compared with relying solely on detection, a combination of the detection and the tracking improves the speed and the realizability, and enhances the robustness by using timing information of the video stream.

Figure 8:
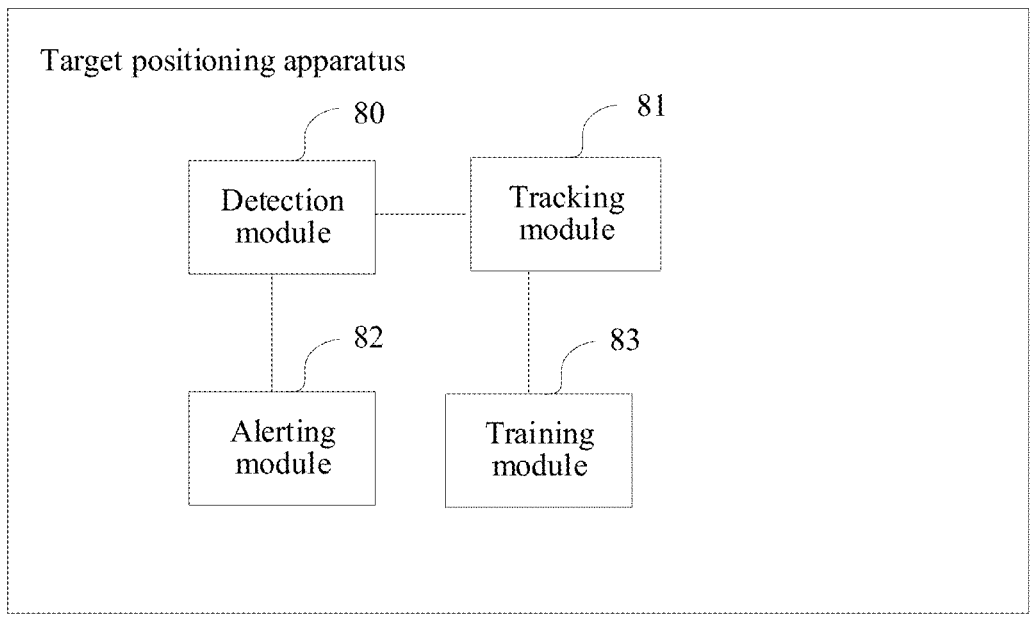
FIG. 8 is a schematic structural diagram of a target positioning apparatus according to embodiment(s) of the present disclosure.

Based on a same inventive concept, this embodiment of the present disclosure further provides a target positioning apparatus. The target positioning apparatus may be, for example, the server in the embodiment, and the target positioning apparatus may be a hardware structure, a software module, or a hardware structure plus a software module. Based on the embodiments, as shown in FIG. 8, the target positioning apparatus in this embodiment of the present disclosure includes: a detection module 80, configured to determine, when or in response to determining that a video frame image including a target lesion is detected from a to-be-detected video stream, location information of the target lesion on the video frame image; and a tracking module 81, configured to: track the target lesion according to the location information of the target lesion on the video frame image, and determine location information of the target lesion on a to-be-tracked video frame image in the to-be-detected video stream.

In certain embodiment(s), during the tracking the target lesion according to the location information of the target lesion on the video frame image, and determining location information of the target lesion on a to-be-tracked video frame image in the to-be-detected video stream, the tracking module 81 is configured to: use a region image corresponding to the location information of the target lesion on the video frame image as a template region image; sequentially select a preset range region image centered on the location information from the to-be-tracked video frame image in the to-be-detected video stream, as a search region image; determine a first similarity value between the search region image and the template region image; and when or in response to determining that it is determined that the first similarity value satisfies a similarity condition, determine that the target lesion is tracked down, and determine location information of the target lesion on the search region image.

In certain embodiment(s), during the determining a first similarity value between the search region image and the template region image, the tracking module 81 is configured to: respectively map the search region image and the template region image to a set-dimensional feature space based on a convolutional neural network, to obtain feature vectors corresponding to the search region image and the template region image; perform a two-dimensional convolution operation on the feature vectors corresponding to the search region image and the template region image to determine a second similarity value between each image block in the search region image and the template region image, each of the image blocks being obtained by sliding a sliding window on the search region image with a preset stride, a size of the sliding window being the same as that of the template region image; and use a two-dimensional matrix formed by arranging the second similarity values according to positions of corresponding image blocks on the search region image as the first similarity value between the search region image and the template region image.

In certain embodiment(s), during the when or in response to determining that it is determined that the first similarity value satisfies a similarity condition, determining that the target lesion is tracked down, and determining location information of the target lesion on the search region image, the tracking module 81 is configured to: when or in response to determining that it is determined that a second similarity value not less than a preset threshold exists in the two-dimensional matrix of the first similarity value, determine that the target lesion is tracked down; and determine location information of an image block corresponding to the largest second similarity value among the second similarity values as the location information of the target lesion on the search region image.

In certain embodiment(s), when or in response to determining that the video frame image including the target lesion is detected from the to-be-detected video stream, the method further includes: an alerting module 82, configured to issue an alert in a preset manner to indicate that the target lesion appears.

In certain embodiment(s), during the tracking the target lesion according to the location information of the target lesion on the video frame image, and determining location information of the target lesion on a to-be-tracked video frame image in the to-be-detected video stream, the tracking module 81 is configured to: trigger a trained tracking model, track the target lesion based on the tracking model by using the location information of the target lesion on the video frame image as an input parameter, and determine the location information of the target lesion on the to-be-tracked video frame image in the to-be-detected video stream, the tracking model being obtained through training according to a training image sample pair set, the training image sample pair set including a plurality of training image sample pairs with similarity value labels, the training image sample pair being constructed based on two video frame images selected from a video stream sample in which the target lesion appears.

In certain embodiment(s), during the tracking the target lesion based on the tracking model by using the location information of the target lesion on the video frame image as an input parameter, and determining the location information of the target lesion on the to-be-tracked video frame image in the to-be-detected video stream, the tracking module 81 is configured to: use the location information of the target lesion on the video frame image as the input parameter, and respectively map the template region image and the search region image to the set-dimensional feature space by using two identical neural networks, to obtain the feature vectors corresponding to the search region image and the template region image, a network structure of the tracking model including at least two identical neural networks, the neural network including at least a convolutional layer and a pooling layer, the template region image being a region image corresponding to the location information of the target lesion on the video frame image, and the search region image being a preset range region image selected from the to-be-tracked video frame image and centered on the location information of the target lesion; perform the two-dimensional convolution operation on the feature vectors corresponding to the search region image and the template region image by using the convolutional layer to obtain the first similarity value between the search region image and the template region image; and when or in response to determining that it is determined that the first similarity value satisfies the similarity condition, determine that the target lesion is tracked down, and determine location information of the target lesion on the search region image.

In certain embodiment(s), the apparatus further includes a training module 83, configured to: obtain the training image sample pair set; and separately input the training image sample pairs to the tracking model for training until a loss function of the tracking model converges, to obtain a trained tracking model, the loss function being a sum of cross entropies between determined similarity values of the training image sample pairs and the similarity value labels.

In certain embodiment(s), when or in response to determining that the training image sample pair set is obtained, the training module 83 is configured to: obtain a video stream sample set in which the target lesion appears, the video stream sample set including a plurality of video stream samples in which the target lesion appears; for each video frame image included in the video stream samples and by using the target lesion as a center, select a first preset range of template region image and a second preset range of search region image from the each video frame image, the second preset range being greater than the first preset range; select two video frame images from video frame images included in the video stream samples, and select a template region image of one video frame image and a search region image of the other video frame image among the two selected video frame images; and use the selected template region image and search region image as a training image sample pair, and generate a similarity value label of the training image sample pair, the similarity value label being the two-dimensional matrix.

Based on the embodiments, an embodiment of the present disclosure further provides an electronic device in another exemplary implementation. In some implementations, the electronic device in this embodiment of the present disclosure may include a memory, a processor, and computer-readable instructions stored in the memory and executable by the processor, the processor, when executing the computer-readable instructions, implementing steps in the target positioning method in the embodiments.

For example, description is made by using an example in which the electronic device is the server 100 in FIG. 1 in the present disclosure. The processor in the electronic device is the processor 110 in the server 100, and the memory in the electronic device is the memory 120 in the server 100.

Based on the embodiments, in this embodiment of the present disclosure, one or more non-volatile storage media storing computer-readable instructions are provided, the computer-readable instructions, when executed by one or more processors, causing the one or more processors to perform the target positioning method in any of the embodiments.

A person skilled in the art is to understand that the embodiments of the present disclosure may be provided as a method, a system, or a computer-readable instruction product. Therefore, the present disclosure may use a form of hardware-only embodiments, software-only embodiments, or embodiments combining software and hardware. In addition, the present disclosure may use a form of a computer-readable instruction product that is implemented on one or more computer-usable storage media (including but not limited to a disk memory, a CD-ROM, an optical memory, and the like) that include computer-usable program code.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The present disclosure is described with reference to flowcharts and/or block diagrams of the method, the device (system), and the computer-readable instruction product according to the embodiments of the present disclosure. Computer-readable instructions can implement each procedure and/or block in the flowcharts and/or block diagrams and a combination of procedures and/or blocks in the flowcharts and/or block diagrams. These computer-readable instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer-readable instructions may also be stored in a computer-readable memory that can guide a computer or another programmable data processing device to work in a specified manner, so that the instructions stored in the computer-readable memory generate a product including an instruction apparatus, where the instruction apparatus implements functions specified in one or more procedures in the flowcharts and/or one or more blocks in the block diagrams.

The computer-readable instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more procedures in the flowcharts and/or in one or more blocks in the block diagrams.

Although exemplary embodiments of the present disclosure have been described, once a person skilled in the art learn the basic creative concept, additional changes and modifications may be made to these embodiments. Therefore, the following claims are intended to be construed as to cover the exemplary embodiments and all changes and modifications falling within the scope of the present disclosure.

Obviously, a person skilled in the art can make various modifications and variations to the embodiments of the present disclosure without departing from the spirit and scope of the embodiments of the present disclosure. In this way, if these modifications and variations made to the embodiments of the present disclosure fall within the scope of the claims of the present disclosure and equivalent technologies thereof, the present disclosure also intends to include these changes and variations.

What is claimed is:

1. A target positioning method, comprising:
   determining, in response to determining that a video frame image including a target lesion is detected from a video stream, location information of the target lesion on the video frame image; and
   tracking the target lesion according to the location information of the target lesion on the video frame image, comprising:
   using a region image corresponding to the location information of the target lesion on the video frame image as a template region image;
   selecting a preset range region image centered on the location information from a video frame image in the video stream as a search region image;
   respectively mapping the search region image and the template region image to a set-dimensional feature space based on a convolutional neural network, to obtain search feature vectors corresponding to the search region image and template feature vectors corresponding to the template region image;
   performing a two-dimensional convolution operation on the search feature vectors and the template feature vectors to determine a second similarity value between each image block in the search region image and the template region image, each image block being obtained by sliding a sliding window on the search region image with a preset stride;
   using a two-dimensional matrix formed by arranging the second similarity values according to positions of corresponding image blocks on the search region image as a first similarity value between the search region image and the template region image;
   in response to determining that the first similarity value satisfies a similarity condition, determining that the target lesion is tracked down, and determining location information of the target lesion on the search region image.

2. The method according to claim 1, wherein
a size of the sliding window is the same as that of the template region image.

3. The method according to claim 1, wherein determining that the target lesion is tracked down, and determining the location information of the target lesion comprises:
determining that the target lesion is tracked down in response to determining that a second similarity value not less than a preset threshold exists in the two-dimensional matrix of the first similarity value; and
determining location information of an image block corresponding to the largest second similarity value among the second similarity values as the location information of the target lesion on the search region image.

4. The method according to claim 1, further comprising:
issuing an alert in a preset manner to indicate that the target lesion appears.

5. The method according to claim 1, wherein tracking the target lesion comprises:
triggering a trained tracking model, tracking the target lesion based on the tracking model by using the location information of the target lesion on the video frame image as an input parameter, and determining the location information of the target lesion on the video frame image in the video stream, the tracking model being obtained through training according to a training image sample pair set, the training image sample pair set including a plurality of training image sample pairs with similarity value labels, the training image sample pair being constructed based on two video frame images selected from a video stream sample in which the target lesion appears.

6. The method according to claim 5, wherein tracking the target lesion comprises:
using the location information of the target lesion on the video frame image as the input parameter, and respectively mapping the template region image and the search region image to the set-dimensional feature space by using two identical neural networks, to obtain the search feature vectors corresponding to the search region image and the template region image, a network structure of the tracking model including at least two identical neural networks, the neural network including at least a convolutional layer and a pooling layer;
performing the two-dimensional convolution operation on the search feature vectors corresponding to the search region image and the template region image by using the convolutional layer to obtain the first similarity value between the search region image and the template region image; and
in response to determining that the first similarity value satisfies the similarity condition, determining that the target lesion is tracked down, and determining location information of the target lesion on the search region image.

7. The method according to claim 5, further comprising:
obtaining the training image sample pair set; and
inputting the training image sample pairs to the tracking model for training, to obtain a trained tracking model.

8. The method according to claim 7, wherein obtaining the training image sample pair set comprises:
obtaining a video stream sample set in which the target lesion appears, the video stream sample set including a plurality of video stream samples in which the target lesion appears;
for each video frame image included in the video stream samples and by using the target lesion as a center, selecting a first preset range of template region image and a second preset range of search region image from the each video frame image, the second preset range being greater than the first preset range;
selecting two video frame images from video frame images included in the video stream samples, and selecting a template region image of one video frame image and a search region image of the other video frame image among the two selected video frame images; and
using the selected template region image and search region image as a training image sample pair, and generating a similarity value label of the training image sample pair, the similarity value label being the two-dimensional matrix.

9. A target positioning apparatus, comprising: a memory storing computer program instructions; and a processor coupled to the memory and configured to execute the computer program instructions and perform:
determining, in response to determining that a video frame image including a target lesion is detected from a video stream, location information of the target lesion on the video frame image; and
tracking the target lesion according to the location information of the target lesion on the video frame image, comprising:
using a region image corresponding to the location information of the target lesion on the video frame image as a template region image;
selecting a preset range region image centered on the location information from a video frame image in the video stream as a search region image;
respectively mapping the search region image and the template region image to a set-dimensional feature space based on a convolutional neural network, to obtain search feature vectors corresponding to the search region image and template feature vectors corresponding to the template region image;
performing a two-dimensional convolution operation on the search feature vectors and the template feature vectors to determine a second similarity value between each image block in the search region image and the template region image, each image block being obtained by sliding a sliding window on the search region image with a preset stride;
using a two-dimensional matrix formed by arranging the second similarity values according to positions of corresponding image blocks on the search region image as a first similarity value between the search region image and the template region image;
in response to determining that the first similarity value satisfies a similarity condition, determining that the target lesion is tracked down, and determining location information of the target lesion on the search region image.

10. The target positioning apparatus according to claim 9, wherein
a size of the sliding window is the same as that of the template region image.

11. The target positioning apparatus according to claim 9, wherein determining that the target lesion is tracked down, and determining the location information of the target lesion includes:
determining that the target lesion is tracked down in response to determining that a second similarity value not less than a preset threshold exists in the two-dimensional matrix of the first similarity value; and determining location information of an image block corresponding to the largest second similarity value among the second similarity values as the location information of the target lesion on the search region image.

12. The target positioning apparatus according to claim 9, wherein the processor is further configured to execute the computer program instructions and perform:
issuing an alert in a preset manner to indicate that the target lesion appears.

13. The target positioning apparatus according to claim 9, wherein tracking the target lesion includes:
triggering a trained tracking model, tracking the target lesion based on the tracking model by using the location information of the target lesion on the video frame image as an input parameter, and determining the location information of the target lesion on the video frame image in the video stream, the tracking model being obtained through training according to a training image sample pair set, the training image sample pair set including a plurality of training image sample pairs with similarity value labels, the training image sample pair being constructed based on two video frame images selected from a video stream sample in which the target lesion appears.

14. The target positioning apparatus according to claim 13, wherein tracking the target lesion includes:
using the location information of the target lesion on the video frame image as the input parameter, and respectively mapping the template region image and the search region image to the set-dimensional feature space by using two identical neural networks, to obtain the search feature vectors corresponding to the search region image and the template region image, a network structure of the tracking model including at least two identical neural networks, the neural network including at least a convolutional layer and a pooling layer;
performing the two-dimensional convolution operation on the search feature vectors corresponding to the search region image and the template region image by using the convolutional layer to obtain the first similarity value between the search region image and the template region image; and
in response to determining that the first similarity value satisfies the similarity condition, determining that the target lesion is tracked down, and determining location information of the target lesion on the search region image.

15. The target positioning apparatus according to claim 13, wherein the processor is further configured to execute the computer program instructions and perform:
obtaining the training image sample pair set; and
inputting the training image sample pairs to the tracking model for training, to obtain a trained tracking model.

16. The target positioning apparatus according to claim 15, wherein obtaining the training image sample pair set includes:
obtaining a video stream sample set in which the target lesion appears, the video stream sample set including a plurality of video stream samples in which the target lesion appears;

for each video frame image included in the video stream samples and by using the target lesion as a center, selecting a first preset range of template region image and a second preset range of search region image from the each video frame image, the second preset range being greater than the first preset range;
selecting two video frame images from video frame images included in the video stream samples, and selecting a template region image of one video frame image and a search region image of the other video frame image among the two selected video frame images; and
using the selected template region image and search region image as a training image sample pair, and generating a similarity value label of the training image sample pair, the similarity value label being the two-dimensional matrix.

17. A non-transitory computer-readable storage medium storing computer program instructions executable by at least one processor to perform:
determining, in response to determining that a video frame image including a target lesion is detected from a video stream, location information of the target lesion on the video frame image; and
tracking the target lesion according to the location information of the target lesion on the video frame image, comprising:
using a region image corresponding to the location information of the target lesion on the video frame image as a template region image;
selecting a preset range region image centered on the location information from a video frame image in the video stream as a search region image;
respectively mapping the search region image and the template region image to a set-dimensional feature space based on a convolutional neural network, to obtain search feature vectors corresponding to the search region image and template feature vectors corresponding to the template region image;
performing a two-dimensional convolution operation on the search feature vectors and the template feature vectors to determine a second similarity value between each image block in the search region image and the template region image, each image block being obtained by sliding a sliding window on the search region image with a preset stride;
using a two-dimensional matrix formed by arranging the second similarity values according to positions of corresponding image blocks on the search region image as a first similarity value between the search region image and the template region image;
in response to determining that the first similarity value satisfies a similarity condition, determining that the target lesion is tracked down, and determining location information of the target lesion on the search region image.

* * * * *